UNITED STATES PATENT OFFICE.

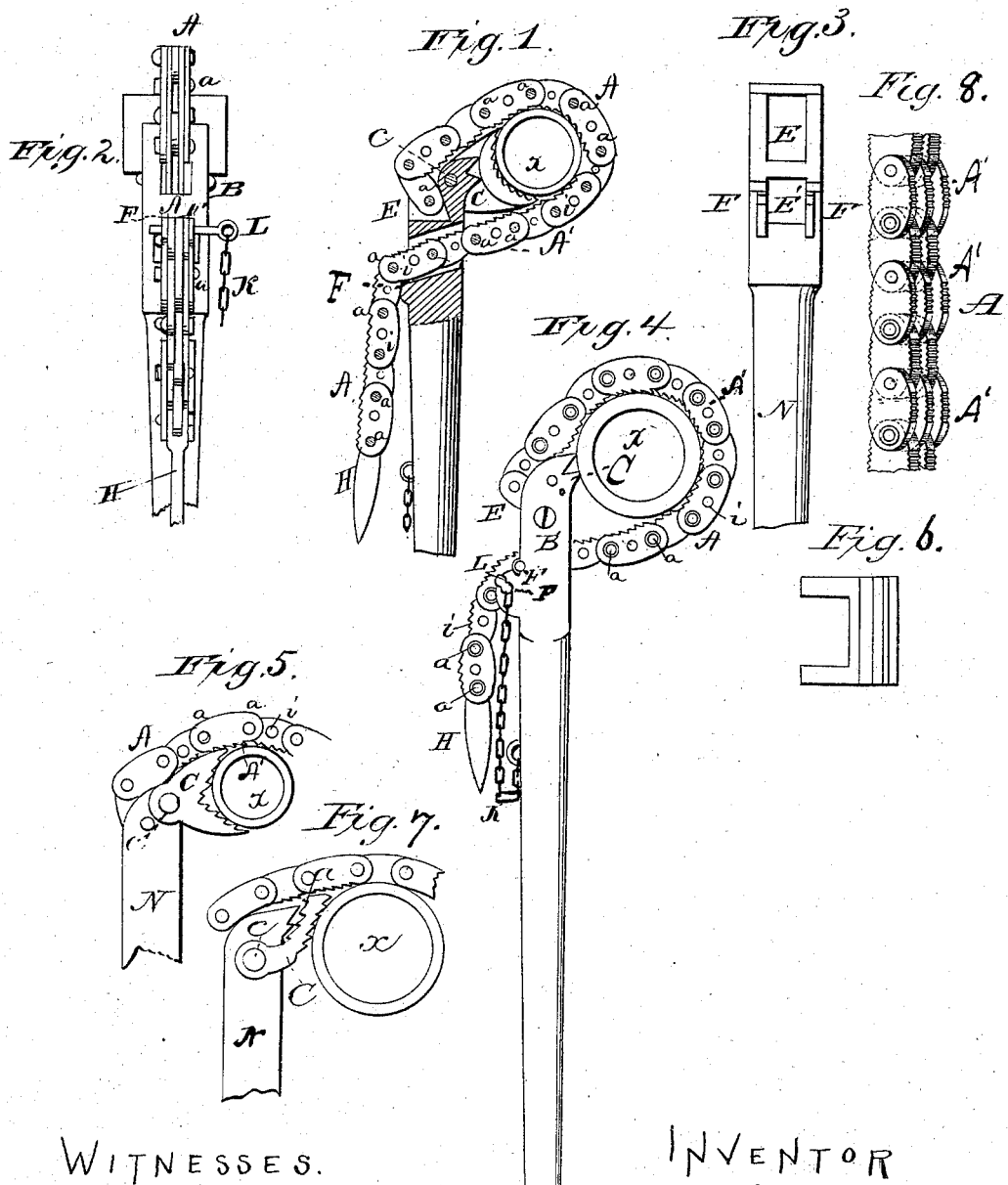

WLADYSLAW T. KOSINSKI, OF BROOKLYN, NEW YORK, ASSIGNOR OF FOUR-TENTHS TO ANTHONY ODASZ AND WILLIAM C. BOWERS, BOTH OF SAME PLACE.

PIPE-WRENCH.

SPECIFICATION forming part of Letters Patent No. 241,674, dated May 17, 1881.

Application filed December 20, 1880. (Model.)

*To all whom it may concern:*

Be it known that I, WLADYSLAW THEODORE KOSINSKI, of Brooklyn, county of Kings, S ate of New York, have invented a certain new and useful Pipe-Wrench, of which the following is a specification.

My invention relates to improvements in the class of pipe-wrenches in which a chain is employed as the holding or griping means controlled and operated by a lever provided with a griping end, one end of that holding or griping chain being pivoted at a convenient point to the lever, while the other end is capable of being passed around the pipe to be turned and held by another part of the lever.

According to my invention I employ a lever or handle the upper end of which is provided with a bearing-surface, and is also so formed as to receive and hold one end of a link-chain, which is pivoted to the handle by a screw or pin passing therethrough, while the opposite end is secured by being passed through a slot in the lever, and retained by means of a pin or stud passed through the chain and resting in seats in the back of the lever.

The links of my chain are flat and held together by means of rivets or screws, and arranged in their length so as to correspond exactly with the circumference of the various standard sizes of steam and gas pipes. I propose to mark the several links by numbers, indicating the sizes of pipes that can be operated when the retaining-pin is placed in position in the same after having passed through the slot in the handle.

The handle is formed with two or more recesses or seats for the reception of the retaining-pin, in order to adapt the device to the variations of external circumferential measurements of tubes formed of different thicknesses the internal diameter of which is the same.

The accompanying drawings form a part of this specification and represent what I consider the best means of carrying out the invention.

Figure 1 is a side view, partly in section. Fig. 2 is an edge view. Fig. 3 is an edge view of the lever alone. Fig. 4 is an edge view of the device complete in use on a pipe. Figs. 5, 6, 7 show modifications. Fig. 8 is a perspective view of the chain.

Similar letters of reference indicate corresponding parts in all the figures.

A' A' are series of flat links forming the griping-chain A.

*a a* are the link rivets or screws by which the links of the chain are held together.

E is a recess formed in the upper end of the lever N for the reception of the gripe-chain A.

C is a removable bearing-surface secured to the lever N by a rivet, *c*, so as to allow it to be removed and exchanged, if desired.

B is the screw or pin by which the griping-chain A is attached to the lever or handle.

E' is a slot or opening formed near the upper end of the lever N for the passage of the chain through the lever after the same has been passed around the pipe to be operated upon.

F F are seats for the retaining-pin L to rest in. These seats serve to provide for the slight deviations that may occur in the thickness of the metal of the pipes to be operated upon. The chain-links are provided with holes *i* for the reception of the retaining-pin L.

The front end of the chain A is formed with an angular point, H, pivoted to the last length and of sufficient length to pass readily through the slot or opening E'.

The retaining-pin L is permanently connected to the lever N by a small chain, K.

The number of links, A', their length, and their strength should be proportioned to the class of pipes for which the wrench is intended. The length of the several links A' and the distance from each other of the holes *i* are such as to correspond exactly with the difference in the circumference of the standard sizes of pipes—that is to say, that the position of these links is such, not being wound exactly once around the pipe, but approaching the pipe at a tangent from the point of permanent attachment of the chain, and leaving it again at a tangent where the chain leaves the pipe on the other side, it follows that even where the standard diameters of pipes vary by regular increments at quarters of an inch the links coming into use to accommodate the successive enlargements should not be of uniform length.

The standard sizes of pipes are liable to vary from time to time, and I can lay down no exact rule for adapting my chain thereto better than to prescribe that the length of the successive links which come into use, as larger and larger pipes are embraced, shall be carefully determined by trial previous to their manufacture. With proper care the length can be proportioned very accurately, so as to adapt the wrench to fit all the standard sizes.

Pipes are ordinarily made of a standard diameter internally. In such case the external diameter, which is sized by the chain, will vary within narrow limits for each given size of interior, according as the thickness of the pipe is greater or less. This thickness, or difference in thickness, is very marked with some styles of brass and copper pipe. My seats F F, of which two only are shown, but more may be used, allow the pin L to be shifted into the several seats to accommodate these slight variations. For some uses it is desirable to bend the chain A in the opposite direction, so as to receive the pipe or the bolt, bolt-head, or other object on the other side of the lever N. It will be understood that to effect this the chain A is bent around in the opposite direction to that shown, and its point H inserted through the slot E' in the opposite direction to that shown. The device will then gripe the article by the opposite side of the lever instead of the bearing-surface C. For some work this is preferable. The holes $i$ become available to receive the pin L in the same manner as before described.

I have represented the links as serrated on both edges, so as to equally adapt the chain A to work in either position. I do not, however, esteem the serrations essential to the success of my invention. My experiments indicate that the device will gripe powerfully and work perfectly with smooth edges.

Fig. 4 shows the device in which the removable bearing-surface C is removed, and a properly prepared bearing-surface, C, under it is made available to act against the pipe X. The device thus equipped serves in the same manner.

The removable quality of the principal bearing-surface serves two important ends—it allows the bearing-surface to be readily replaced in case of wear or damage, and the substitution of a thicker or thinner piece or its removal altogether gives an additional adaptability of the device to different diameters of pipe.

Having thus described my invention, what I claim, and desire to secure by Letters Patent, is—

1. The chain-wrench described, having a chain composed of differential links spaced to correspond with the standard sizes of pipes, said links having key-holes, also differentially arranged for the same purpose, combined with a lever, an adjustable fastening, and a rough bearing-surface, as herein specified.

2. The combination, with a lever N, provided with slot E', seats F F, and rough bearing-surface, as shown, of a chain, A, having differential perforated links A', and means L, for securing at the required lengths, as and for the purpose set forth.

In witness whereof I hereunto set my hand this 4th day of May, 1878.

W. T. KOSINSKI.

Witnesses:
   CHR. GOETZ,
   F. KIRCHNER.